UNITED STATES PATENT OFFICE.

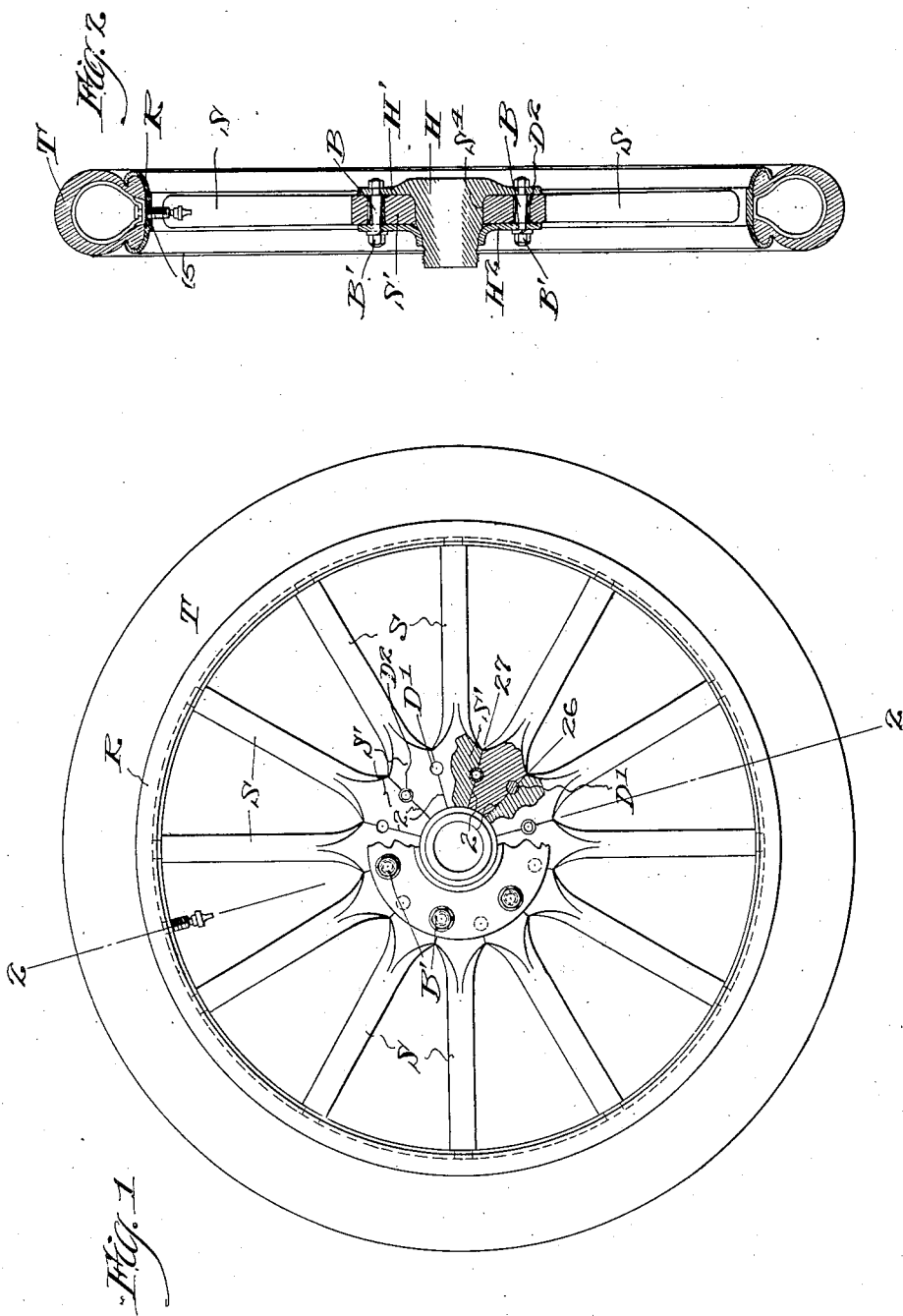

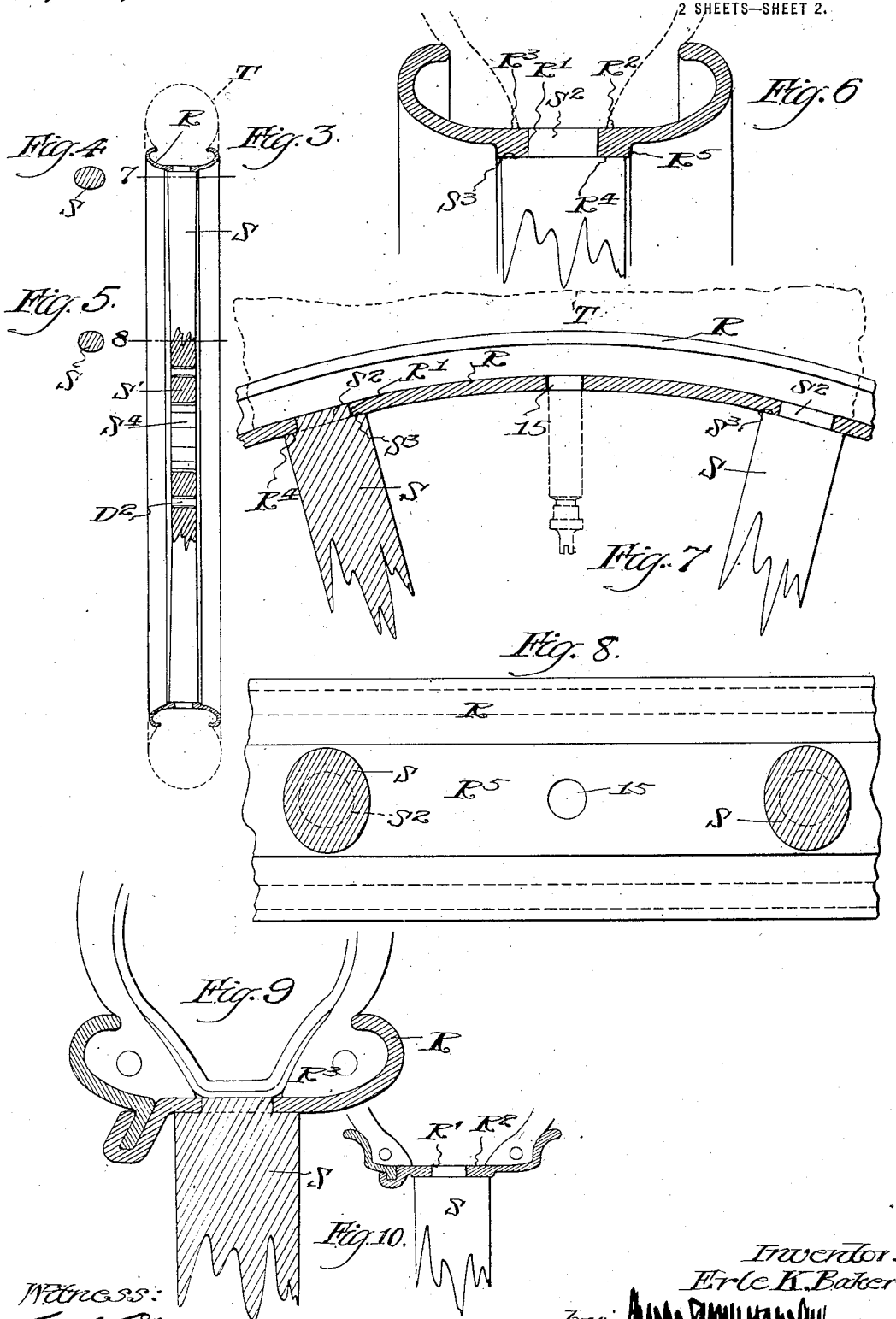

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

WHEEL FOR AUTOMOBILES.

1,334,011.   Specification of Letters Patent.   Patented Mar. 16, 1920.

Application filed October 6, 1919. Serial No. 328,682.

*To all whom it may concern:*

Be it known that I, ERLE K. BAKER, a citizen of the United States, and a resident of Chicago, county of Cook, and State of Illinois, have invented certain new and useful Improvements in Wheels for Automobiles, of which the following is a specification.

My invention relates to motor vehicle wheels, especially to those of the class which I have made known as "semi-wood" wheels, and includes such as are characterized by fixed rims adapted directly to receive pneumatic tires, to be later inflated thereon; either before or after the wheel is mounted on the vehicle.

The object of my invention is to provide an automobile wheel of exceptional strength, lightness, resilience, durability, and safety, and to employ therein a minimum number of wooden and metal parts, all of such simple construction and so easily assembled as to make it possible to manufacture wheels of great strength and resilience at less cost and of less weight than ordinary wood wheels adapted to the same service.

My novel wheels and the method by which they are produced will be readily understood on reference to the drawings which form part of this specification, in which: Figure 1 is a side view of an automobile wheel embodying my invention and equipped with a pneumatic tire;—Fig. 2 is a section thereof on the line 2—2 of Fig. 1;—Fig. 3 is a sectional view showing the wheel as it appears when removed from the hub of the vehicle;—Figs. 4 and 5 are spoke sections on respective lines 7 and 8 of Fig. 3;—Fig. 6 is a section of the tire-holding rim and a spoke-end tenoned therein, enlarged from Fig. 3;—Fig. 7 is a circumferential section of the rim with two spoke ends therein;—Fig. 8 is a plan view of the parts shown in Fig. 7;—Figs. 9 and 10 illustrate tire-holding rims of the quick detachable type, to-wit, such as have a removable flange to suit a Q. D. tire.

The new article of manufacture in its best form is a non-warping hubless wheel adapted to be mounted upon a motor vehicle hub of standard design; and which comprises very few parts, to-wit, an endless metal rim and a complement of radial wooden spokes the outer ends of which directly engage and support said rim and the inner ends of which form an all-wood hub center; containing preferably a number of parts which hold the component spoke butts against relative displacement. The fixed rim, R, of the wheel essentially is an endless ring flanged to resist circumferential distortion and of a diameter and circumference determined by the pneumatic tire, T, which it is to carry; and, as shown, the rim is one which directly carries and holds the tire. By reason of the method (see my Patent No. 1,324,293) that I prefer to follow in making or assembling these wheels; the initial size of the rim, that is, its size at the moment of assembly with the spokes, S, is greater than appears in the finished wheel. This initial enlargement of the rim permits the spokes to be assembled therein with their inner ends or butts in proper relation but in relatively loose condition. After such assembly, the circumference of the rim is reduced and in that operation all of the spokes are driven inward to compress and uniformly densify the hub-center portion of the wheel and leaving the rim in a state of strong circumferential tension, resisted by the spokes upon which it rests and hence bearing strongly and squarely upon the said spokes. The wooden spokes, S, though preferably round, oval, or ovoid, may be of any desired cross-section, but always have mitered or wedge shaped butts, S'; as shown in the drawings. These butts taken together make up the all-wood hub-center. They are cut or mitered on planes, 2, which include or parallel the axis of the wheel, which description is intended to include slight departures from such planes when a dished wheel is required. Initially, the spokes are longer and the butts are wider than they appear in the finished wheel. After being loosely assembled in the wheel plane, the spokes are all forced equal distances toward the wheel center, this being accomplished through the medium or agency of the encircling metal rim, R, which bears directly upon the ends of the spokes and which is compressed to the limits of a circular stop. The inward thrust of the spokes in the direction of their grain, not only sets the spoke butts, S', firmly together, but operates to compress them one against the other to a very considerable extent. In every wheel the wood composing the spokes is amply able to resist longitudinal compression but the wood composing some of the spokes is softer than in others, and under compression the softer spoke butts crush or yield transversely to a greater extent than the firmer ones, with the result that all of the spoke butts are brought to a state of substantially uniform density and hence to a state of substantially uniform strength. The interlocking parts which I prefer to employ, to prevent the wheel from bulging or otherwise changing its shape at the hub center, are preferably wooden or metal dowel pins. These dowels parallel the axis of the wheel and serve to lock the spoke butts against relative movement either longitudinally or transversely. They are applied after the hub-center is compressed and so well serve their purpose that even if one or two spokes of the wheel are broken the spoke butts thereof will hold their places and the other spokes will be maintained at maximum strength.

Though comprising so few and such simple and inexpensive parts, the wheel has characteristics which make it superior to all others. Chiefly these: 1st. The hub-center portion is of a substantially uniform density throughout and hence forms the best possible base to be secured between hub flanges and to serve as a foundation for the radiating spokes. 2nd. The spoke butts comprising the hub-center are straight mitered, and preferably are additionally interlocked and hence the wheel is warp-proof and need not be fastened on a temporary hub or between plates while not in use on a vehicle hub. 3rd. The spokes are of the greatest length possible in a wheel of given diameter and develop maximum of resilience under axial torsion and lateral stress. 4th. The wooden spokes are directly engaged with, and directly incorporated in, the metal rim; and the latter cannot be disengaged therefrom unless the entire wheel is broken. 5th. The metal rim is in a state of strong circumferential tension, and hence constantly exerts a strong and uniform inward pressure upon each spoke, so that every spoke is kept tight and the denser condition of the hub center is always maintained. 6th. Due to the method by which they are made, the wheels are uniformly round for the spokes are of equal length measured from the center and thus insure the concentricity of the rim which is seated directly upon the ends of the spokes. 7th. As flowing from these structural features, it may be mentioned that the wheel is of extraordinary strength and durability and may be made of less weight and better appearance than other wheels suited to the same load and road service; or if made of approximately the same dimensions as the latter, a further margin of safety is added. 8th. The wheel is never affected by atmospheric or climatic conditions, for it is in a state of constant compression throughout.

As indicated in the drawings, I prefer to connect the fixed rim (whatever its form) and the spokes positively, by tenoning the spokes in the rim. (See spoke tenons $S^2$ and rim-bearing shoulders, $S^3$). Also by preference, I accommodate the spoke tenons in preferably tapered holes $R^1$ punched in the flat or base portion $R^2$ of the rim; which holes receive and tightly fit the spoke tenons $S^2$ and allow them to extend through flush with the outer periphery $R^3$ of the rim; as shown in Figs. 6 to 10, inclusive. I find this of advantage in the case of a rim which directly receives the inflated tire, for the outer end of the spoke tenon, in each case, is made smooth and flush with the tire seat or outer periphery, $R^3$, and serves to restore the portion of the tire seat which was removed in punching or drilling the tenon hole, $R^1$. And as a final operation in making the wheel, it is painted; leaving the tire seat, $R^3$, smooth and the ends of the wooden spokes barely distinguishable. In each such case the inner periphery, $R^4$, of the rim rests upon a spoke shoulder, $S^3$, which is amply wide notwithstanding the relatively large diameter of the short strong tenon, $S^2$. In the operation of punching the holes, $R'$, the rim base, preferably, is slightly flattened adjacent each hole thus accommodating the normally curved rim to the square turned shoulder, $S^3$, of the wooden spoke. S. Though not essential, the spokes preferably are tapered and are wider at the rim than at the hub center. By such form the appearance of the wheel is improved; a wider bearing is provided for the fixed rim, and the spokes are made more resiliently responsive to torsional strains. For the purpose of strengthening the fixed rim in both radial and transverse directions and deepening the sockets or holes therein, and especially in the case of an integrally flanged fixed clencher rim, such as detailed in Figs. 6, 7, 8 and 10, I provide a ribbon-like projection, $R^5$, of slightly greater width than the spoke ends. This added thickness appears only on the inner periphery and adds but slightly to the weight of the rim. Yet therein I accomplish these important purposes besides which the low projection or raised flat on the rim's inner periphery defines the spoke end seat fully as well as would a felly; giving the wheel a distinct appearance of completeness and evidencing its strength.

The modifications appearing in Figs. 9 and 10 being so clearly shown, do not require separate description.

As before stated, the spokes are crowded inward toward the wheel center and their straight mitered butts are compressed in the process of setting up the wheel. The strong encircling rim holds the spokes in this condition and in so doing is assisted by the before mentioned devices which positively interlock the several spoke butts against displacement with respect to one another. By preference, I employ dowel pins as such interlocking parts, using as many pins as there are spokes. A hole is drilled for each dowel pin. This hole parallels the axis of the wheel and is positioned approximately midway between spoke butts in each case, so that the hole is intersected by the miter plane between the spoke butts. Referring to Fig. 1, the dowel pins, D¹, are solid wooden pins driven into respective holes. The dowels, D², alternated therewith, are somewhat larger metal tubes. In position, these last correspond to the usual position of the hub bolts, B, belonging to the vehicle hub, H, and are large enough to receive them. The bolts, B, are preferably rigidly secured in the fixed back flange, H¹, of the hub, H. The wheel contains a central hub-hole, S⁴, the walls of which are formed by the inner ends of the spoke butts. This hole is made to fit the barrel of the hub, H, and obviously when the wheel is pushed on to the hub the bolts, B, enter the hollow dowels, D²; and the wheel is secured on the hub by means of the usual loose or front hub flange, H², coacting with nuts, B¹, on the outer ends of the bolts, B. The bolts, B, may be tapered, as shown in Fig. 2, but in all cases I prefer that the hollow dowels or sleeves, D², shall be straight, lest they be too easily dislodged from the hub-center of the wheel. As a further precaution in this regard, I preferably flare or expand the ends of each sleeve, D², as shown in Fig. 2. A further purpose in flaring the ends is to countersink them slightly below the side surfaces of the hub-center to prevent interference with the squeezing of the wooden hub-center between the flanges, H¹ and H² of the hub. I find it best to drill the dowel holes and place the dowels after the hub-center is compressed and finished.

The dowels are of considerable length, and as they lie at right angles to the longitudinal axis of the spokes, and are placed between the spokes in each case, they serve to prevent all of the twisting, warping, and expanding movements which would otherwise cause the wheel to lose its original shape. Also, the interlocking dowels by holding the hub-center against outward expansion, prevent the spokes from thrusting out against the metal rim and thus the metal rim is permitted to retain its original tension and pressure upon the spokes. By "original tension" I mean the state of tension in which the rim is left by the process of its manufacture.

It will be understood that a valve stem hole, such as 15, is provided in every fixed rim.

Having thus described my invention, I claim as new and desire to secure by Letters Patent:

1. The new article of manufacture comprising an automobile wheel for pneumatic tires and composed of a single group of radially positioned wooden spokes having integrally tenoned ends and mitered butts, which latter form a hub-center portion, in combination with an endless metal rim permanently mounted on said spokes and suitably flanged to contain a pneumatic tire, and having holes which receive the tenons of respective spokes, and the outer ends of the spoke tenons being finished flush with the outer periphery of said rim and therefore serving to restore the portions of the tire seat removed in the making of the tenon holes therein.

2. The new article of manufacture comprising an automobile wheel for pneumatic tires and composed of a single group of radially positioned wooden spokes having integrally tenoned ends and mitered butts, which latter form a hub-center portion, in combination with an endless metal rim permanently mounted on said spokes and suitably flanged to contain a pneumatic tire, and having holes which receive the tenons of respective spokes, and the outer ends of the spoke tenons being finished flush with the outer periphery of said rim and therefore serving to restore the portions of the tire seat removed in the making of the tenon holes therein, and means forming part of said hub center and adapted to prevent relative movement of said mitered butts.

3. The new article of manufacture comprising an automobile wheel for pneumatic tires and composed of an endless metal fixed rim presenting tire-holding flanges and a relatively thickened or reinforced middle or base portion, the latter containing spoke tenon holes which extend through the tire seating periphery of the rim, in combination with a complement of radial wooden spokes, the butts of which form a hub-center portion and the ends of which are provided with integral tenons permanently fitted in respective tenon holes in said fixed rim, and the ends of said tenons being finished flush with said tire seating surface of the rim.

In testimony whereof I have hereunto set my hand this 4th day of October, 1919.

ERLE KING BAKER.